United States Patent
Akers et al.

(10) Patent No.: US 6,967,952 B1
(45) Date of Patent: Nov. 22, 2005

(54) METHOD AND APPARATUS FOR PROVIDING HIGH CAPACITY, LONG LOOP BROADBAND ADSL SERVICE

(75) Inventors: Francis I. Akers, Hillsborough, CA (US); Daniel W. Agar, San Ramon, CA (US); Frederick J. Brandt, Redwood City, CA (US)

(73) Assignee: GoDigital Networks, Corp., Fremont, CA (US)

( * ) Notice: Subject to any disclaimer, the term of this patent is extended or adjusted under 35 U.S.C. 154(b) by 892 days.

(21) Appl. No.: 09/775,936

(22) Filed: Feb. 1, 2001

Related U.S. Application Data (60) Provisional application No. 60/179,776, filed on Feb. 2, 2000, provisional application No. 60/198,485, filed on Apr. 18, 2000.

(51) Int. Cl.[7] .......................... H04L 12/28; H04L 12/56
(52) U.S. Cl. ................ 370/395; 370/238.1; 370/310.1; 370/310.2; 455/460; 455/422.1
(58) Field of Search ............................. 370/420, 467, 370/468, 485, 395.1, 401, 409, 397, 463, 370/465, 466, 522, 492, 352, 356, 392, 246, 370/274, 501, 353, 487, 493, 464, 395, 238.1, 370/310.1–310.2; 375/215, 211, 214; 379/90.01, 379/93.01, 338–349, 399.01, 93.05, 93.09, 379/93.08, 93.31, 165, 30, 4; 455/103, 248.1, 455/422.1–460

(56) References Cited

U.S. PATENT DOCUMENTS

| | | | |
|---|---|---|---|
| 6,052,412 A | 4/2000 | Ruether et al. | ............. 375/231 |
| 6,151,364 A | 11/2000 | Ruether et al. | ............. 375/254 |
| 6,236,664 B1 * | 5/2001 | Erreygers | .................... 370/492 |
| 6,266,395 B1 * | 7/2001 | Liu et al. | ................. 379/27.01 |
| 6,335,936 B1 * | 1/2002 | Bossemeyer et al. | ....... 370/420 |
| 6,362,630 B1 * | 3/2002 | Lowell et al. | ............. 324/600 |
| 6,466,588 B1 * | 10/2002 | Michaels | .................... 370/493 |
| 6,483,902 B1 * | 11/2002 | Stewart et al. | ........... 379/90.01 |

FOREIGN PATENT DOCUMENTS

| | | | | |
|---|---|---|---|---|
| EP | 0 767 596 A2 | 4/1997 | .......... | H04Q 11/04 |
| WO | WO 00/02335 | 1/2000 | ............. | H04J 3/06 |
| WO | WO 00/33512 | 6/2000 | ........... | H04L 12/28 |

* cited by examiner

*Primary Examiner*—Wellington Chin
*Assistant Examiner*—Jamal A. Fox
(74) *Attorney, Agent, or Firm*—Sierra Patent Group, Ltd.

(57) ABSTRACT

Method and apparatus for providing a long loop broadband service which allows data from different ADSL users to be shared and transported across a group (possibly a group of one) of line-powered, repeatered copper pairs utilizing a symmetric transmission approach is disclosed. Multiple ADSL users are able to share the bandwidth on pair(s) between the Remote Terminal Unit and Central Termination Unit by converting the ADSL data into ATM cells that are properly addressed and sent over the pair(s). Straight-Through Repeaters can be used in between the Central Termination Unit and the Remote Termination Unit on each of the pairs to extend the reach of the system. In this manner, the reach of ADSL (or other) internet access can be increased from its present 15 to 18 kft limitation to over 40,000 feet using 26 gauge wire, effectively reaching over 99% of subscribers.

15 Claims, 5 Drawing Sheets

METHOD AND APPARATUS FOR PROVIDING HIGH CAPACITY, LONG LOOP BROADBAND ADSL SERVICE

PRIORITY CLAIM UNDER 35 USC §119

The present application claims priority to provisional application No. 60/179,776 filed on Feb. 2, 2000 and provisional application No. 60/198,485, filed on Apr. 18, 2000 under 35 USC § 119.

BACKGROUND OF THE INVENTION

1. Field of the Invention

The present invention relates to method and apparatus for providing Asymmetric Digital Subscriber Line (ADSL) service. More particularly, the present invention relates to method and apparatus for providing extended range broadband ADSL service for multiple users over a single twisted copper pair line.

2. Description of the Related Art

With rapidly increasing use of personal computers to access the internet, the market for broadband systems has been likewise developing to meet the necessary transmission bandwidth to reach residential and commercial sites. One such broadband system is a Digital Subscriber Line (DSL) system which is a high speed data transmission system that can transmit high speed data for applications such as video conferencing, fast internet access, interactive multimedia, on-line home banking, remote office or remote LAN applications. An ADSL system uses the existing twisted copper pair telephone lines to transmit digital signals in addition to the analog telephone signals between the users and the telephone companies, or in some circumstances, between the users and internet service providers (ISPs).

Compared with conventional analog modems that can accommodate a transmission rate of at most 56 kbps, ADSL systems can achieve access speeds that are approximately 150 times faster than the analog modems. A significant advantage of ADSL systems is that they can exist concurrently with the telephone signals such that a user connected to the internet via an ADSL modem can, at the same time, place or receive telephone calls using the same existing telephone line. This eliminates the need for installation of a second or third telephone line as would be the case when using an analog modem. In turn, this translates to substantial savings to the user, not to mention the much faster data access.

Demand from business or residential subscribers for higher speed internet access at lower costs has created a strong demand for DSL type services which provide digital access to the internet connections speed ranging from around 128 kbps up to 8 Mbps. Several different types of DSL systems exist. These include IDSL, HDSL, HDSL-2, SDSL, VDSL and RADSL, ADSL and ADSL Lite systems.

IDSL is an ISDN (Integrated Services Digital Network) based DSL system which uses 2B1Q line coding and typically supports duplex data transfer rates of 128 to 144 Kbps.

Also using 2B1Q line coding, HDSL refers to High Bit-Rate DSL which is generally used to deliver T1/E1 services, and supports full-duplex symmetric data transmission at rates up to 1.544 Mbps over 2 pairs of existing twisted copper pair telephone lines depending upon the transmission distance. While traditional T1 (E1 in Europe) requires repeaters at every 6,000 ft to boost the signal strength, an HDSL system can accommodate longer distances without the use of repeaters to support data transmission over approximately 12,000 kft.

HDSL-2 is a relatively new transmission technology that has recently become an ANSI standard for transmission of T1 (1.544 Mbps) rate data over a single copper pair. Unlike HDSL, HDSL-2 does not use 2B1Q encoding, but rather uses PAM-16 coding approach which allows for the same transmission bandwidth as HDSL, but using half as much copper plant (for example, one twisted copper pair instead of two). Similar to HDSL-2, G.shdsl has been recently developed as an ITU standard for data transmission using PAM-16 coding scheme.

SDSL is a symmetric DSL system that is essentially a 2-wire implementation of a 2B1Q HDSL system. One implementation of symmetric DSL supports T1/E1 on a single twisted copper pair to a transmission distance of approximately 10,000 ft. A more common implementation of SDSL transmits sub-T1 speeds (for example, 384 kbps) to greater distances (up to 18,000 feet). Further, VDSL, Very High Bit-Rate DSL, has been proposed to support data rates exceeding 10 Mbps for comparatively shorter distances, such as 3,000 Kft.

ADSL, or Asymmetric DSL, is defined by its ability to provide much faster downstream transmission rates (of up to approximately 8 Mbps) compared to upstream data transmission rates (of up to approximately 1 Mbps). Since most residential computer users connected to the internet generally spend the majority of the time downloading information from the internet rather than uploading (or sending) information, this system is amenable to most users. Moreover, given its applicability for the residential mass-market, ADSL is projected to be the dominant form of DSL in the future.

Carrierless amplitude and phase modulation (CAP modulation) and Discrete Multitone modulation (DMT modulation) are two different modulation systems (or "line codes") for ADSL currently on the market. More specifically, CAP modulation is a version of Quadrature Amplitude Modulation (QAM) in which incoming data modulates a single carrier that is then transmitted over a twisted copper pair telephone line and where the carrier itself is suppressed before transmission (i.e., the carrier contains no information, and thus, can be reconstructed at the receiving side). On the other hand, DMT modulation is a multicarrier modulation system in which incoming data is collected and then distributed over a large number of small individual carriers each of which uses a form of QAM modulation, and creates these channels using Discrete Fast-Fourier Transform. The ITU has specified DMT-based ADSL in its standards, and at the present time, the popularity of CAP-based ADSL appears to be on the decline.

ADSL-Lite, also known as "G.lite", is an ITU standard (G.992.2) for providing a lower-speed, lower-power, widely interoperable form of ADSL-DMT. Its speeds are limited to 1.5 Mbps downstream and 512 kbps upstream. This limitation results in a simpler chipset, thus enabling low-power operation and wide interoperability among the DSL products of multiple vendors. A RADSL system is a Rate Adaptive DSL system that supports a wide range of DSL transmission rates. Originally, RADSL systems were ADSL systems that used CAP modulation rather than DMT modulation. However, today, DMT-based ADSL systems are also rate-adaptive, thus the terms "RADSL" and "ADSL" are generally synonymous.

The existing telephone plant includes twisted copper pairs extending from telephone central offices to subscribers. This is known as the outside plant (OSP) and may reach 25 miles or more. Statistically, 50% of subscribers reside within a 12,000-foot radius of the central office, 85% reside within 18,000 feet and approximately 99% of subscribers are within 40,000 feet.

The transmission distance of a RADSL/ADSL system varies according to the transmission bandwidth. At short distances (less than 8,000 feet), the ADSL systems can transmit at their full rates. However, at longer distances, the speeds available with ADSL systems decrease. Indeed, the longer the copper loop, the less bandwidth the system can support. As the loop length increases, a point is reached at which the system ceases to function altogether. This point is generally somewhere between 15,000 and 18,000 feet, depending on wire gauge and condition.

Existing ADSL systems and other DSL systems discussed above are generally limited to a transmission distance of up to 18,000 feet without the use of repeaters. It should be noted that the transmission distance is generally measured from the telephone company's central office to the customer premise equipment (CPE). In the United States, as discussed above, 18,000 feet covers less than 85% of subscribers. With higher transmission frequencies attenuating faster than at lower frequencies (for example, 784 kbps (SDSL) travels about 12,000 feet, while 256 kbps may travel up to 18,000 feet), and given a rapid rise in customer demands for higher speed internet access, customers are restricted ever more by their distance from the central office. In practice, an ADSL system at a transmission rate of 1.5 Mbps downstream may only work to a distance of 14,000 feet, serving approximately 60% of all potential subscribers.

The GDSL-8 system available from GoDigital Networks Corporation, the assignee of the present invention, provides multiple (for example, eight) telephone channels over a single copper pair, using a GDSL® Symmetric DSL transmission scheme transmitting at 544 kbps. Additional information related to the GDLS-8 system can be found in pending application Ser. No. 09/510,050 entitled Multiple Digital Subscriber Carrier System with Drop and Insert Repeater System, assigned to the assignee of the present application, and the disclosure of which is incorporated herein by reference in its entirety for all purposes. Another implementation of the GDSL system (the GDSL-12) is configured to run at 784 kbps with a payload of 12 telephone channels. The SDSL chips may transport anywhere from 160 kbps up to 2 Mbps in both directions simultaneously (symmetrical transmission) and are deployed in the telephone network for T1, ISDN, DAML, xDSL and other services.

As discussed above, ADSL service is generally provided to the user with the downstream rate greater than the upstream rate. For example, one ADSL service from Pacific Bell provides 784 kbps downstream and 384 kbps upstream. By slowing down the downstream channel, an asymmetric form of ADSL-DMT may be deployed to end-users. Additionally, US West currently offers some symmetric services to residential users that are not SDSL, but actually are ADSL-based. These services do not use 2B1Q transmission, but rather CAP modulation, and thus, fall into the category of ADSL systems discussed above.

The most common form of ADSL high speed service for internet access uses an ATM (asynchronous transfer mode) transport from the subscribers' terminal (such as personal computers), through the ADSL system, an into the telephone company's ATM switching network. In fact, the ITU standards for ADSL transmission call for ATM to be the transport protocol. An ATM network uses short, fixed-length cells with minimal headers, to allow calls to be routed at high speed by routing tables at each switch. The header of each ATM cell typically consists of 5 bytes and the cell information field includes 48 bytes, making a total cell length of 53 bytes. Accordingly, the header of each ATM cell is configured to provide two main routing functions—a Virtual Path Identifier (VPI) and a Virtual Call Identifier (VCI).

In a typical application, users send and receive almost no data most of the time during which the users (or user terminals) are connected to the internet. For internet access which is by far the most common application of ADSL, the system operates at a high data rate when downloading data in the form of pages or files. During the time that the users spend reading or reviewing the downloaded material, the connection line is again nearly idle. Indeed, a typical user may download and request data at a high rate for 5 to 30 minutes for every 24 hours. In particular, it is unlikely that more than one of the four ADSL users connected to an RTU will be downloading simultaneously, and further, it is more unlikely that more than two users will be doing so simultaneously.

An ADSL system requires a copper pair connected from the central office to each subscriber. While DMT-based repeaters may be developed to extend the range of ADSL transmission (i.e., repeating ADSL with additional ADSL spans), a separate circuit including the related hardware cost and a separate copper pair for each user is necessary.

SUMMARY OF THE INVENTION

In view of the foregoing, in one embodiment of the present invention, there is provided a data loop extension in a communication system, including a symmetric bi-directional transmission line having a first end and a second end; a remote termination unit coupled between the first end of the transmission line and a plurality of customer premise equipment, the remote termination unit configured to receive a plurality of ATM data from each customer premise equipment over a respective ADSL link for transmission over the transmission line; and a line card coupled to the second end of the transmission line configured to receive the ATM data transmitted from the remote termination unit over the transmission line; and at least one repeater coupled between the first and second end of the transmission line configured to detect the ATM data received from the remote termination unit and to regenerate the ATM data for transmission to the line card.

In accordance with another embodiment of the present invention, there is provided a method of providing data loop extension in a communication system, comprising the steps of: providing a symmetric bi-directional transmission line having a first end and a second end; coupling a remote termination unit between the first end of the transmission line and a plurality of customer premise equipment, the remote termination unit configured to receive a plurality of ATM data from each customer premise equipment over a respective ADSL link for transmission over the transmission line; coupling a line card to the second end of the transmission line configured to receive the ATM data transmitted from the remote termination unit over the transmission line; and coupling at least one repeater between the first and second end of the transmission line configured to detect the ATM data received from the remote termination unit and to regenerate the ATM data for transmission to the line card.

The GDSL-8 and GDSL-12 systems presently available from GoDigital Networks Corporation, the GDSL® links are provided to transmit multiple services on a single copper loop are implemented using 2B1Q technology (i.e., the SDSL described above). In one embodiment of the present invention, however, rather than 2B1Q coding scheme, PAM-16 technology (for example, the G.shdsl or the HDSL-2 described above) may be used. For simplicity, the use of either 2B 1 Q, PAM-16, or any other symmetric transmission method, is generally referred to hereinbelow as GDSL. The connections over copper pairs using GDSL which transmit data in both directions between two pieces of telecommunications equipment as referred to as GDSL links.

Indeed, the long loop broadband system in accordance with the present invention allows data from different ADSL users to be shared across a group of symmetric DSL trunks (GDSL links). The group of trunks could, in one embodiment, may only include a single GDSL link (single copper pair). In accordance with the present invention, multiple ADSL users may share the bandwidth on the GDSL links between RTU and CTU by taking ATM cells from the ADSL transmissions, properly addressing them and sending them over the GDSL links. While ATM is a convenient and inexpensive approach to provide the addressing, any scheme that addresses the data and allows it to be sent over any available trunk would be equally effective.

These and other features and advantages of the present invention will be understood upon consideration of the following detailed description of the invention and the accompanying drawings.

DESCRIPTION OF THE PREFERRED EMBODIMENT

Figure 1:
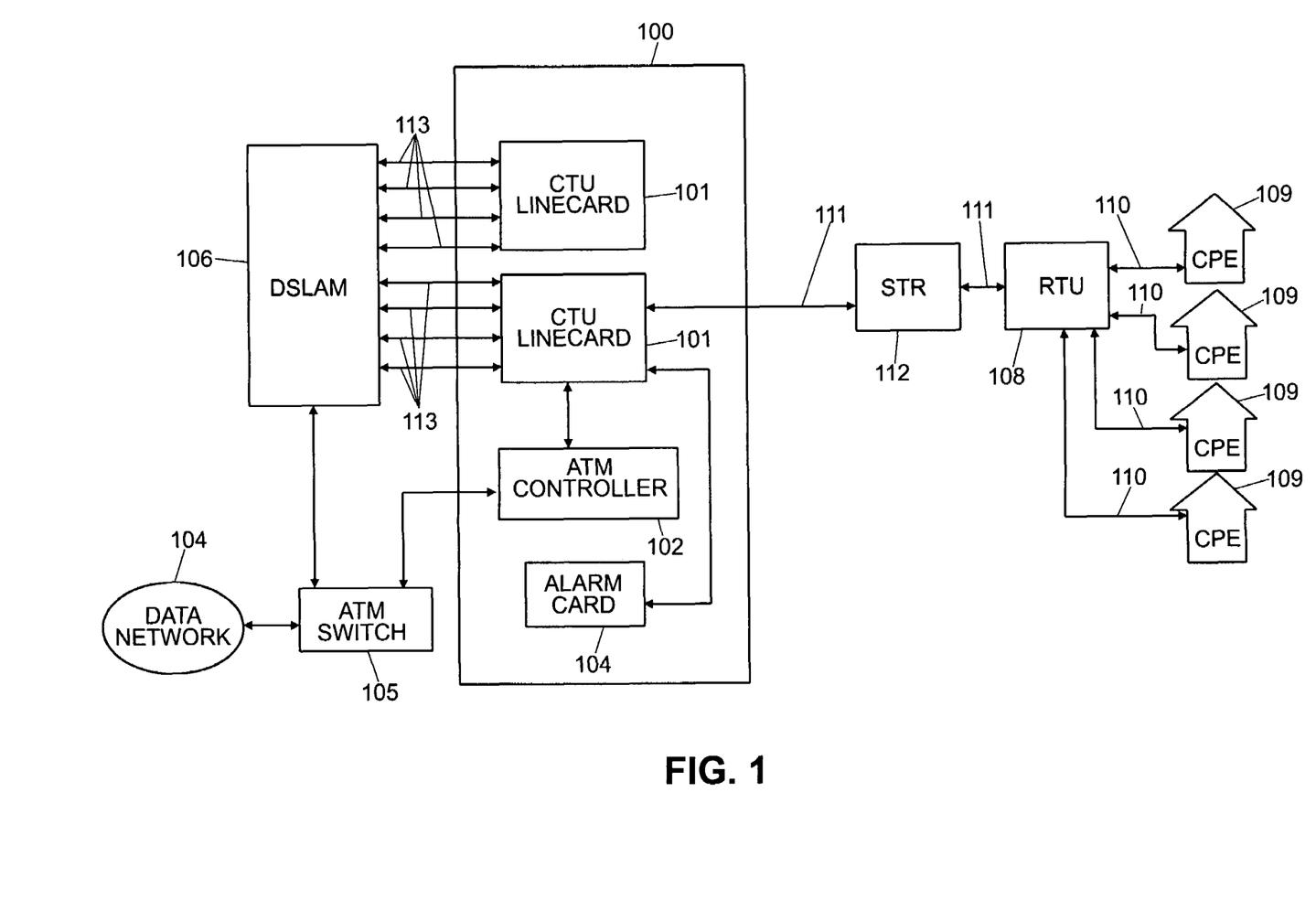
FIG. 1 illustrates a block diagram of the overall system architecture in accordance with one embodiment of the present invention.

FIG. 1 illustrates a block diagram of the overall system architecture in accordance with one embodiment of the present invention. Referring to FIG. 1, in the central termination unit (CTU) 100 at the central office (CO) side, there is provided CTU line card 101 which is connected to ATM controller 102 by backplane bus 103. Also shown are ATM switch 105 configured to communicate with ATM controller 102 and data network 107, and Digital Subscriber Line Access Multiplexer (DSLAM) 106 coupled to four ADSL links 113 to each CTU line card 101. In one embodiment, backplane bus 103 supports time domain multiplexing (TDM) for transporting ATM cells. Also shown is alarm card 104 that communicates with CTU linecard 101 to provide alarm information such as channels out of service to the central office. It should be noted that the number of CTU line cards 101 in the overall system may be increased as long as there are available slots in the CTU shelf 100.

Referring to FIG. 1, at the remote end, there is shown remote termination unit (RTU) 108 which is provided with an ADSL link 110 from each of the four customer's Customer Premise Equipment (CPE) 109. As will be discussed in further detail below, CPE 109 encapsulates IP packets inside the ATM cells. As further shown, RTU 108 at the remote end is connected to the corresponding CTU line card 101 at the central office by a line powered, single twisted copper pair line 111, which, in one embodiment, is a GDSL link implemented using HDSL-2 or G.shdsl technology capable of supporting a symmetric transmission rate of 1.544 Mbps. Additionally, in one embodiment, one or more straight-through repeaters (STR) 112 may provided in the path of line powered twisted pair 111 between the central office and the remote end to extend the range of the overall system.

In the upstream direction of data transmission, the ATM cells from customer's CPE 109 are transmitted to RTU 108 and then transported over the line powered twisted pair 111 (the GDSL link) with intermediate stops at STRs 112, as needed, to the central office side. As will be discussed in further detail below, in one embodiment of upstream data link, ATM cells received by CTU linecard 101 are decoded from the GDSL link into bit streams, still in the ATM cell format, and transmitted over backplane bus 103 to ATM controller 102. In turn, ATM controller 102 is configured to connect to a single ATM link to ATM switch 105 to transmit and receive data from data network 107. Alternatively, in another embodiment, for upstream data link, ATM cells received at CTU linecard 101 are converted into ADSL format and transported over a two-wire connection to an ADSL port (not shown) of DSLAM 106 which, then connects to ATM switch 105 for data communication with data network 107.

Referring again to FIG. 1, in one embodiment, one or more STRs 112 may be used as necessary between CTU linecard 101 at the central office side and RTU 108 at the remote end to extend the range of the system to 40,000 feet or even further, depending on wire gauge. In particular, each deployed STR 112 in the network increases the overall range of the system by approximately 9,000 feet (the range, using G.shdsl or HDSL-2 transmission on 26 gauge wire).

In one embodiment, STRs 112 may be configured to read the contents of an incoming HDSL-2 or G.shdsl GDSL connection and then to regenerate the signal and send it down to the next GDSL link. It should be noted that STRs 112 do not decode or process any of the ATM cells. Furthermore, STRs 112, similar to RTU 108, may be line powered by the dc voltage on the twisted copper pair 111 supplied from the central office.

Figure 2:
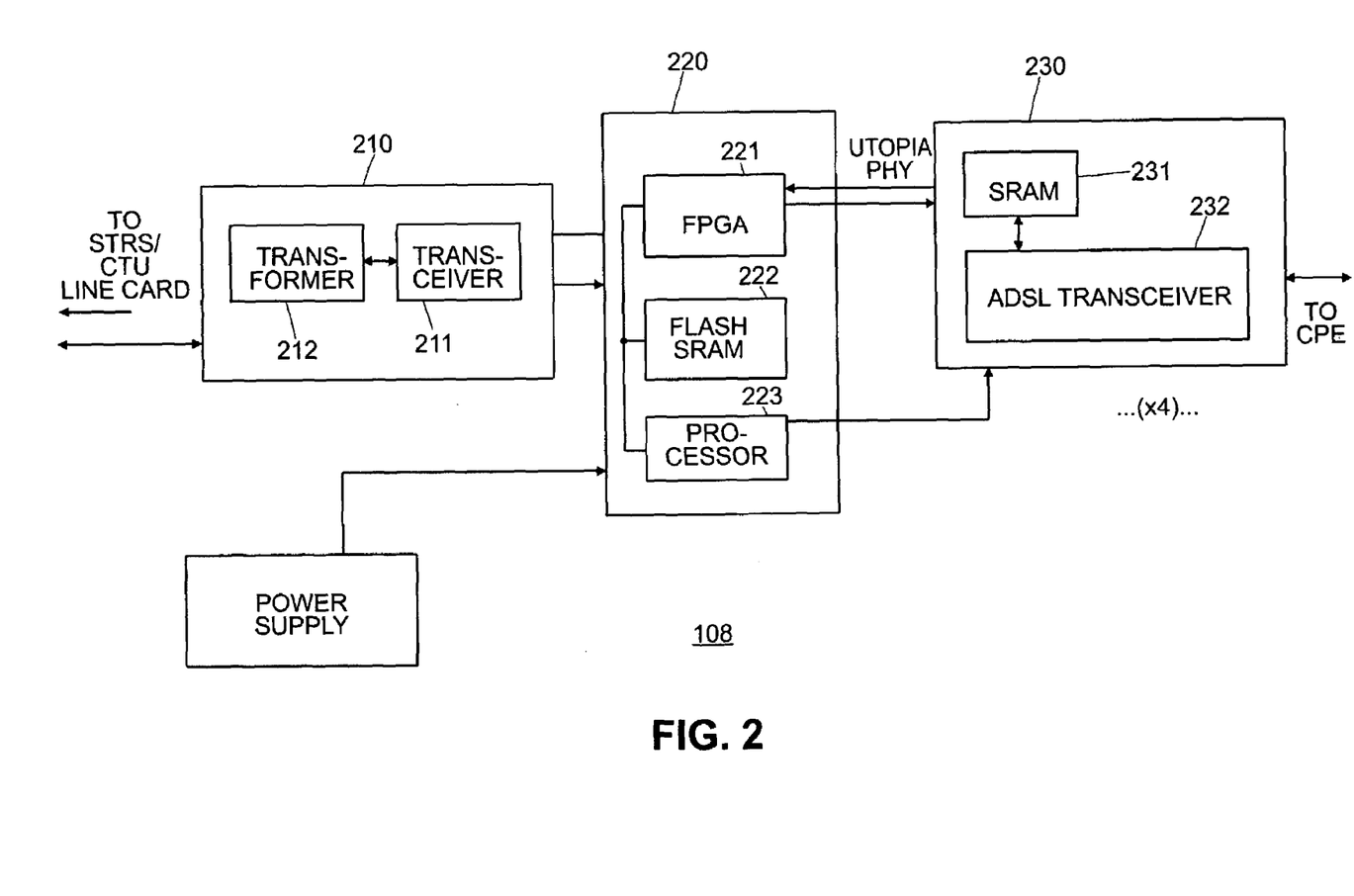
FIG. 2 illustrates a block diagram of the Remote Termination Unit (RTU) in accordance with one embodiment of the present invention.

FIG. 2 illustrates a block diagram of Remote Terminal Unit 108 of FIG. 1 in one embodiment of the present invention. As shown, RTU 108 is provided with GDSL link section 210, control section 220 and ADSL link section 230. In one embodiment, GDSL link section 210 is provided with transceiver 211 and transformer 212 which allows RTU 108 to be connected to single twisted copper pair 111 transmission path. Moreover, ADSL link section 230 which may be provided for communication with CPE 109 may be provided with SRAM 231 and ADSL transceiver 232 which, in one embodiment, may be Socrates transceiver available from Infineon Corporation. In this manner, ADSL link section 230 in one embodiment allows RTU 108 to connect to each ADSL link 110 to respective CPEs 109.

Further shown in FIG. 2 is control section 220 which includes processor 223 coupled to field programmable gate array (FPGA) 221 and flash SRAM 222, and in the manner shown, controls RTU 108 to property address incoming and outgoing data between GDSL link section 210 and ADSL link section 230 for connection between the twisted pair transmission path 111 and the plurality of ADSL links 110, respectively, at either side of RTU 108. Optionally, RTU 108 may be provided with a separate power supply 240 to provide power thereto. Alternatively, as discussed above, RTU 108 may be powered by the dc voltage on twisted copper pair line 111 supplied from the CTU 100 at the central office side.

Referring back to FIG. 1, in one embodiment, RTU 108 is configured to transmit and receive ATM cells on a GDSL link such as twisted copper pair 111. The other end of RTU 108 is connected to a plurality of ADSL links 110, each configured to communicate with an ADSL modem at CPE 109 of each customer over a standard ADSL-DMT connection. In one embodiment, the ADSL link section 230 may be configured with ADSL transceiver such as Copper Lite transceiver available from Centilium Corporation which are provided with an ADSL port on one side and an ATM port on the other, and the ATM port may be configured to communicate with multiple physical interfaces using 5-bit addressing. Moreover, each ADSL transceiver 232 may be configured to write ATM cells into a buffer.

In one embodiment, RTU 108 is configured to transmit all cells with a given VPI down a particular ADSL link 110 as ATM cells. In particular, RTU 108 may be configured to transmit idle cells down the ADSL link 110 when there are no valid data cells available, and these idle cells are discarded at CPE 109 at the customer's location Moreover, RTU 108 does not need to understand internet protocol (IP) and does not need to use an ATM Adaptation Layer (AAL) 3&4, a standard for adapting other types of data transmission (similar to TCP/IP) to be carried over an ATM network. Indeed, CPE 109 may be configured to reassemble the data packets using AAL 3&4 standard to convert IP packets to ATM cells and vice versa.

Figure 3:
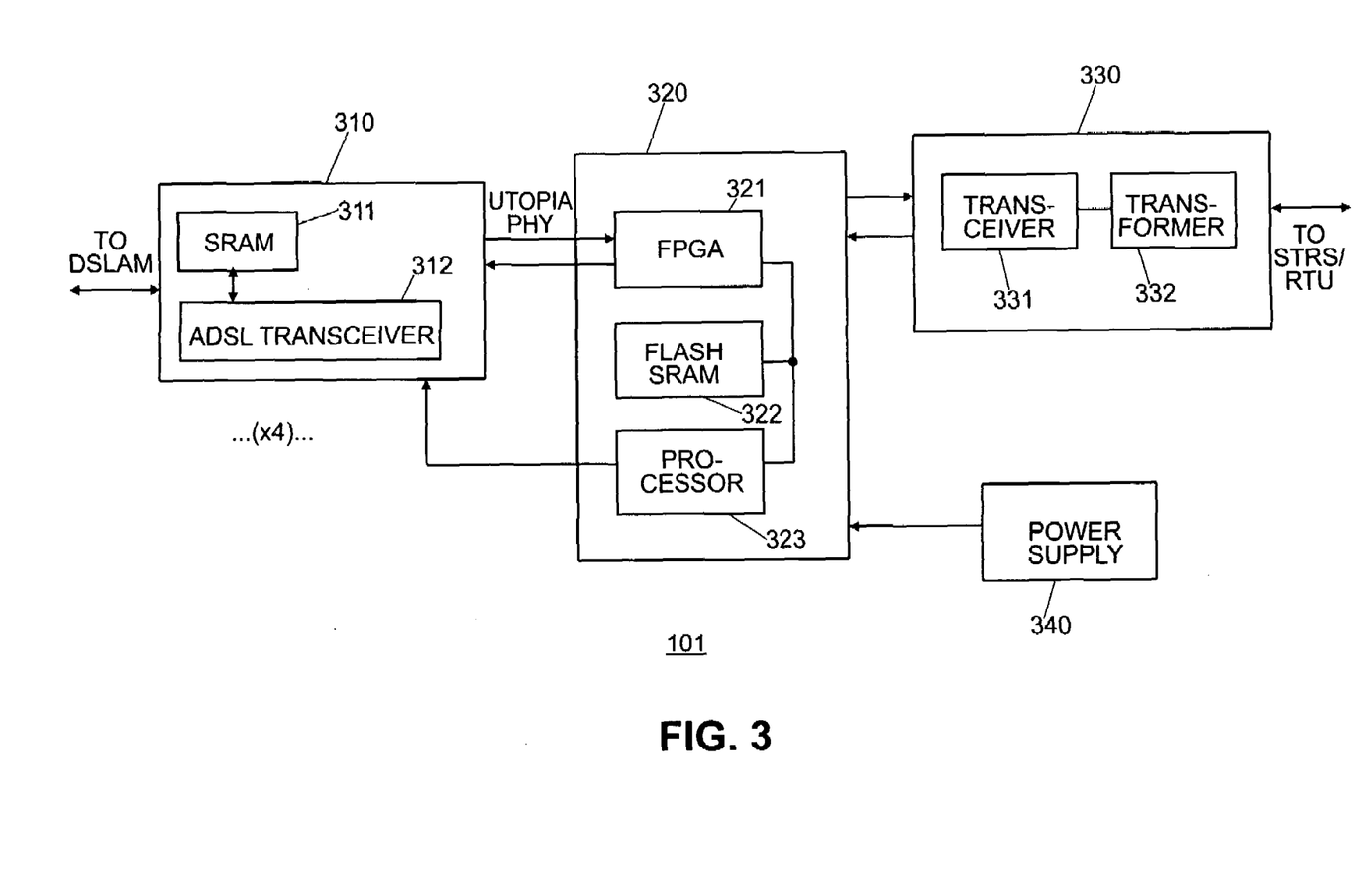
FIG. 3 illustrates a block diagram of the Central Termination Unit (CTU) in accordance with one embodiment of the present invention.

FIG. 3 illustrates a block diagram of CTU line card 101 in accordance with one embodiment of the present invention. Referring to FIG. 3, there are provided ADSL link unit 310, control unit 320 and GDSL link unit 330. Also shown in FIG. 3 is power supply unit 340 coupled to control unit 320 for powering CTU line card 101 as well as for providing dc voltage on the twisted copper pair transmission path 111 to provide line powering to RTU 108 and STRs 112. As shown, ADSL link unit 310 is provided with SRAM 311 and ADSL transceiver 312, while control unit 320 includes FPGA 321, Flash SRAM 322 and processor 323. Furthermore, GDSL link unit 330 is provided with transceiver 331 and transformer 332.

As can be seen from FIG. 3, the components of CTU line card 101 are substantially similar to that of RTU 108, but connected in the opposite direction of data transmission. Indeed, GDSL link unit 330 is coupled to twisted copper pair transmission path 111 (FIG. 1) to receive data from RTU 108 and in turn, to transmit data thereto under the control of control unit 320. Additionally, ADSL link unit 310 coupled to control unit 320 is configured to interface with the ADSL links 113 to DSLAM 106 (FIG. 1).

Referring back to FIG. 1, in the first upstream data link approach, ATM cells transmitted from the customer's CPE 109 to RTU 108 and sent over GDSL link 111 to CTU line card 101 are decoded into bit streams, still in the ATM format, and transmitted over TDM backplane bus 103 to ATM controller 102. ATM controller 102 connects to a single ATM link that is then provided to ATM switch 105. Table 1 below is a data transport table for the first upstream data link approach in accordance with the present invention.

TABLE 1

Transport Table for First Upstream Data Link Approach

| | ATM controller card | CTU line card | RTU |
|---|---|---|---|
| Layer 1 format: | | | |
| Input | DS3 | TDM backplane | GDSL |
| Output | TDM backplane | GDSL | ADSL |
| Layer 2 format: | | | |
| Input | ATM cells | ATM cells | ATM cells |
| Output | ATM cells | ATM cells | ATM cells (2) |
| Understands: | | | |
| ATM headers | Yes | No | Yes |
| IP packets | No | No | No (2) |
| Execution: | | | |
| ATM switching: One to Many | Yes | No | Yes (3) |
| ATM switching: Many to Many | No | No | No |
| Bandwidth management | No | No | No (1) |
| AAL | No | No | No (2) |
| Must have: | | | |
| ATM chips | Yes | No | No (3) |

As can be seen, Layer 1 format refers to the physical layer, for example, related to the speed of the transmission connection, while Layer 2 format refers to the data link layer. Furthermore, with respect to bandwidth management of RTU, if reverse ADSL becomes significant and total possible upstream data from all users exceeds capacity, flow control could be an issue. Moreover, referring to the output and Internet Protocol (IP) packets for the layer 2 format, as well as AAL for RTU 108 as shown in Table 1 above, if CPE 109 also sends ATM cells and upstream flow control is not an issue, there is no need to decode the IP. Finally, ATM switching is not needed if ADSL chipset fulfills necessary conditions as discussed in further detail below.

Referring again to FIG. 1, each CTU line card 101 carries one GDSL link 111 at 1,544 kbps each. Each ATM cell is 53 bytes long, but can be allocated a space of 64 timeslots on the backplane 103. In one embodiment, line card 101 receives a bit clock (master clock) and a quadrature bit clock from the ATM controller 102 as well as a timeslot address and an ATM cell enable as will be discussed in further detail below. Line card 101 receives the DSL bitstream from the associated RTU 108 and generates a corresponding serial bitstream. Over TDM link 111, an ATM cell is transmitted with additional address bits associated with it. In one embodiment, some of these bits may be used as address bits to indicate the proper destination ADSL link while others are used to indicate cell priority.

When the ATM cells emerge at line card 101, the final bits are truncated and the cells are then loaded into an output buffer. When the timeslot signal and the ATM cell enable indicate, ATM controller 102 transmits 53 bytes during 53 timeslots, and receives 53 bytes during 53 timeslots (for example, interleaved with the first 53). Line card 101 has no knowledge of routing and does not know how to read ATM cell headers, and thus, all cells are transferred whether valid, idle, or errored.

In addition to processing ATM cells and transmitting along a GDSL link section 330, as discussed above, CTU 100 is configured to provide line powering for the system. In one embodiment, CTU 100 is provided with a power supply capable of supplying approximately 30 watts of power to the loop, via either a 260V or 380V interface.

Referring back to FIG. 1, backplane data bus 103 in one embodiment may be 8 bits wide. Moreover, as discussed above, each ATM cell is 53 bytes long, but each GDSL link section 330 carrying an ATM data stream may be allocated 64 timeslots (bytes) on the backplane 103. Moreover, in one embodiment, each GDSL link section 330 can be allocated 1,600 cells per second in both transmit and receive directions with a total of 32 GDSL link sections 330 available in a CTU shelf 100. Then, the total throughput requirement would be 51,200 cells in each direction per second.

One frame has 32*64 or 2,048 timeslots in each direction, or a total of 4,096 timeslots which can transfer 102,400 cells per second. In particular, one frame transfers a total of 64 cells per second (32 each way, one for each GDSL link section 330), resulting in 625 usecond frame length. In one embodiment, the timeslots may be clocked in a period of 500 useconds followed by 125 useconds reserved for other uses. With a total of 4,096 timeslots in 500 useconds, the timeslot length and thus, the bit time, is 122 nseconds. The master clock which shifts bits across the backplane bus 103 would run at 8.192 MHz. Accordingly, there may be a 250 usecond transmit frame and then a 250 usecond receive frame, or the backplane direction can be reversed for every timeslot.

Referring back to FIG. 1, line cards 101 may be configured to receive an 8.192 MHz clock from the master clock with its rising edge at 0 degrees, and furthermore, may be configured to write and read the data on the rising edge of this clock. Additionally, line cards 101 may be configured to also receive a quadrature clock with its rising edge at 270 degrees relative to the first clock. In one embodiment, ATM controller 102 is configured to read and write the data in a similar manner, but in alternate timeslots. In this manner, a total of ¾ of each timeslot is available for the data to cross the backplane 103 rather than only ½, which, at 8.192 MHz, translates to a time of 90 nseconds instead of 60 nseconds.

In one embodiment, backplane 103 carries a GDSL span counter that counts from 1 to 32 using 5 bits (expandable to 64 if needed). The span counter increments at every 128 timeslots allowing enough time to transmit and receive one ATM cell from a single span. There can also be an ATM cell enable which can be configured to be active for 53 of each 64 timeslots. The remaining 11 timeslots are reserved for future use. For example, the first and last timeslots can be used as guardband for timing glitches as the timeslot counter is changing, and the other nine timeslots can carry overhead messages.

Referring back to FIG. 1, ATM controller 102 may be configured to generate the clock and timeslot information. The master clock operating at 8.192 MHz does not need to be synchronized to a stratum clock (the network synchronization clock). Rather, it may derive its ATM cell timing from the network where available interface chips have a loop timing mode.

In particular, ATM controller 102 may include one FIFO which receives all of the cells from line card 101 across the backplane 103 in sequence. The input of ATM controller 102 is gated by the ATM cell enable line. Other timeslots which occur when ATM cell enable is inactive are not loaded into the FIFO, but can be used for other functions. Further, the output of ATM controller 102 is read by the ATM UNI chip itself, which does understand headers and addresses. All cells are sent to the external ATM switch 105 except for OAM (Operations, Administrations, and Maintenance) cells, which are a part of the ATM cell stream, coming from RTU 108. To use the OAM cells properly, it must know the timeslot from which they arrived. This can be achieved by knowing and thus tracking the depth of the FIFO in the ATM controller 102, or it can itself insert a special cell at the end of each frame during the extra 125 useconds which its own FIFO receives, and it can count cells from the reception of the OAM cell from RTU 108 to the reception of the special cell.

Referring again to FIG. 1, each RTU 108 is configured with its own unique serial number, for example, a Dallas Semiconductor's Silicon Serial Number. RTU 108 may be configured to communicate this serial number in an OAM cell approximately once every second across each link to which it is connected, causing a negligible reduction in through traffic rate ($1/1600$). The ATM UNI chip receives the OAM cell and associates that unique ID from the particular RTU 108 with a certain group of timeslots, that is, with a particular GDSL link unit 330. In one embodiment, RTU 108 may be associated with more than one GDSL link unit 330. Additionally, if there are DIP switches on CTU line cards 101, the software on the line cards 101 may be configured to compare switch settings with these identifiers, and display an address error if there is a mismatch. This would be helpful to field personnel when they wire the shelf.

In one embodiment, there may be several (approximately 8 or 16) outbound FIFOs on ATM controller 102. Each FIFO may be configured to drive a particular RTU 108, that is, multiple groups of 64 timeslots that are not necessarily sequential. One FIFO may be enabled for 64 timeslots (one group), another for 192 timeslots (three groups), and so on. Cells destined for a particular ADSL end user may be placed in a particular FIFO, and may thus be carried across any of the links to which that ADSL user is connected. ATM controller 102 generates idle cells and sends them in all timeslots for which an actual cell is not available. It is much easier do this function once on ATM controller 102, rather than on every CTU line card 101. Thus, in one embodiment, the maximum number of RTUs 108 may be governed by the number of FIFOs in ATM controller 102.

Each group of GDSL trunks leading to RTU 108 is considered to be a VPI while each ADSL user is considered to be a VCI. Then, the maximum bandwidth of each VPI is programmed into the external ATM switch 105 and the committed information rate of each VCI is also programmed into the external ATM switch 105. These numbers can be altered as more links are added, or as the customer requests a higher grade of service, respectively. In one embodiment, the lowest 5 bits of the VCI can be reserved to indicate which user on a given RTU 108 receives the cell (giving a possible 32 users), with the higher order bits available to the external ATM switch 105 for other purposes. The lowest 7 bits of the VPI may be reserved to indicate which RTU 108 receives the cell (giving a possible 128 RTUs 108), with the higher order bits available to the external ATM switch 105 for other purposes, among those being other GDSL shelves.

In one embodiment, ATM controller 102 communicates with a single external ATM switch 105. It should be noted that if there is a connection to only one external ATM switch 105, that ATM switch 105 can perform all of the bandwidth management. Indeed, it is not necessary to know the minimum CIR for each customer, nor is it necessary to consider cell loss priority or drop valid cells because bandwidth is unavailable, since these can be handled externally by ATM switch 105. Additionally, in one embodiment, ATM controller 102 does not need a SAR (Sequestration, Assembly and Reassembly function), and thus, an ATM user network interface chip such as PMC-Sierra PM5345 or Integrated Device Technology IDT77155 may be used. CTU shelf 100 must know which VPI to associate with a given RTU 108. The logical place is RTU 108, but this approach may be impractical because the RTU 108 is sealed and may already be installed far away when ATM switch 105 is configured. Accordingly, the VPI may be set by a set of front panel DIP switches on line card 101, which, in one embodiment, may be a bank of 8 switches per DSL link. It should be noted that this approach would render the Silicon Serial Number identification as discussed above unnecessary, thus simplifying the system design, and rendering redundant providing address error information as discussed above. Moreover, adding another trunk to an existing RTU 108 would simply require connecting the wires, then setting the VPI switches. The ATM controller 102 loads all cells with a given VPI into a particular FIFO, and that FIFO is configured to send cells to multiple DSLs (i.e., GDSL links 111 to each respective RTU 108).

For a given network having up to 22 Mbps of valid cells in each direction, at which rate several interfaces are available, Table 2 below illustrates some available connections.

TABLE 2

Interface Connection Configurations

| Name | Medium | Total data rate | ATM cell rate | Length | % active cells |
|---|---|---|---|---|---|
| DS3/PLCP | | 44.736 Mbps | 35.63 Mbps | | 62% |
| TAXI/FDDI | Fiber | 120 Mbps | 100 Mbps | | 22% |
| 155M/OC3 | Fiber | 194.4 Mbps | 155 Mbps | 2000 m | 14% |
| 155M | coax cable | 194.4 Mbps | 155 Mbps | 200 m | 14% |
| 155M | CAT5 cable | 194.4 Mbps | 155 Mbps | 90 m | 14% |
| IBM | | 32 Mbps | 25.6 Mbps | | 86% |

The IBM interface may not be desirable because the total bandwidth required is too close to the actual amount necessary. There must be room for a few OAM cells as well as for possible future expansion. Additionally, the physical interface should match the available ATM switching equipment. As can be seen from the above, the SONET/SDH 155 Mbps interface can handle different physical media running different distances, providing sufficient bandwidth, and interface SONET/SDH framers may be configured to add the necessary additional overhead bits for clocking and framing, for example. Furthermore, in one embodiment, network ATM switch 105 may be configured to handle all of the bandwidth management at the central office side and allow the system to simply to pass the cells along.

In the manner described above, in accordance with one embodiment of the present invention, ATM cells are decoded from GDSL link 111 into bit streams, still in ATM format, and transmitted over a TDM backplane to ATM controller 102 which connects to a single ATM link to ATM switch 105. In accordance with another embodiment of the present invention, for upstream data link, CTU line card 101 may be configured to receive ATM data from two-wire ADSL connection to DSLAM 106 as discussed below.

In particular, in accordance with another embodiment of the present invention, the incoming cell traffic at the central office side may be handled without a separate ATM switch 105. In this case, ATM cells are taken from ADSL-DMT connections to DSLAM 106 that resides in the same central office as CTU line card 101. The connections are industry-standard ADSL-DMT 2-wire connections. CTU line card 101 includes circuits that operate as ADSL CPE. In other words, CTU line card 101 may operate in a similar manner as CPE 109 at the remote end, and thus, ATM cells may be read off of these connections and then processed by CTU line card 101 in a manner similar as described above.

In this embodiment, while the operation and functionality RTU 108 and STRs 112 remain the same as described above, ATM Controller 102 and backplane 106 are no longer necessary, thus effectively providing a new design for CTU shelf 100. It should be noted that CTU line cards 101 provided in the first upstream data link approach discussed above may co-exist physically side by side in the same central office system as CTU line cards 101 for the second upstream data link approach set forth below. In particular, Table 3 below is a data transport table for the second upstream data link approach.

TABLE 3

Transport Table for Second Upstream Data Link

| | CTU line card |
|---|---|
| Layer 1 format: | |
| Input | ADSL (2-wire) |
| Output | GDSL |
| Layer 2 format: | |
| Input | ATM cells |
| Output | ATM cells |
| Understands: | |
| ATM headers | Yes |
| IP packets | No |
| Execution: | |
| ATM switching: One to Many | No |
| ATM switching: Many to Many | No |
| Bandwidth management | Yes |
| AAL | No |
| Must have: | |
| ATM chips | No |

In this embodiment, each CTU line card 101 is configured with four ADSL link sections 310, providing four 2-wire connections to ADSL ports on DSLAM 106, which resides in the same central office as CTU line card 101. Then, CTU line card 101 may be configured to send and receive its ATM cells over these links instead of sending the data across the backplane 103 and into ATM Controller 102 as in the case of the first approach. In particular, ATM controller 102 is not necessary in this embodiment, and DSLAM 106 may be configured to perform the functions assigned to ATM switch 105 in the first embodiment.

In particular, the incoming downstream ATM cells are received and then replicated in parallel FIFOs at CTU line card 101, with one FIFO for each ADSL port. Alternatively, more than one FIFO can be used for each ADSL port if ATM QoS priority mechanisms need to be implemented (i.e., to give real-time traffic priority over non-real-time traffic in a congested state). Each FIFO within an ADSL channel would have a different priority level, and cells would be put into priority categories based on their Cell Loss Priority (CLP) bit, or based on their VPI/VCI information. The address information indicating the destination ADSL port within the GDSL system, as well as the priority, is carried in bits associated with each ATM cell, but not as part of it. Indeed, the address information, are transmitted in bytes 54 through 64 of the 56 bits available per 5 link frames in which a cell is sent. It can be seen that this approach requires a higher data rate on CTU line card 101, but still much lower than the buses (i.e., Utopia PHY bus shown in FIG. 3) are equipped to handle.

Referring back to FIG. 3, ADSL transceiver 312 may be configured to handle 155 Mbps at ATM UTOPIA interface between control section 320 and ADSL link section 310. The total bandwidth needed in this mode is 5,455.48 kbps which equals 4×1363.87 kbps, with a minimum byte clock speed necessary at 681.935 kHz, with the maximum clock speed supported by ADSL transceiver 312 such as the Copper Lite transceiver from Centilium Corporation operating at 25 MHz. UTOPIA (Universal Test and Operations Physical Interface for ATM) is an industry standard bus topology and protocol for transferring ATM cells between components in a system. For example, the ADSL transceivers 232, 312 in ADSL link sections 230, 310, respectively, are available from their manufacturers with electrical interfaces that meet the UTOPIA specifications. These transceivers 232, 312 may be directly connected to other parts that use the UTOPIA bus scheme, or can be connected to programmable logic devices, such as the FPGA 221, 321, respectively, that have been programmed to run the UTOPIA interface.

In the manner described above, in accordance with one embodiment of the present invention, CTU line card 101 may be configured to receive ATM data from ATM controller card 102 for upstream data link, while in accordance with another embodiment, CTU line card 101 may be configured to receive ATM data from two-wire ADSL connection to DSLAM 106.

In one embodiment of the present invention, without bandwidth sharing, RTU 108 and CTU line card 101 may be configured with their respective ADSL link units 230, 310 to transmit approximately 384 kbps (or, one-quarter of the total available GDSL bandwidth) in each direction at all times. The address byte would still be used to determine which of the four users the ATM cells belong to, but cell traffic from each user's ADSL connections would be limited by the ADSL speed itself so that the total capacity of the GDSL link(s) is never exceeded.

If ADSL link unit 230 cannot insert idle cells on demand (i.e., in the upstream direction if the physical layer requests a cell and no cell is available), then FPGA 221 in RTU 108 may be configured to perform the same operation without the need for ATM switch 105. This approach uses a simple and inexpensive technique for upstream bandwidth control at RTU 108. However, this approach limits customers to their fraction of the bandwidth available. For example, with one GDSL trunk handling 1,544 kbps upstream, each of the four users would be limited to a payload of ¼ of 1,544 kbps, or about 384 kbps upstream.

Each customer's connection may alternatively burst to a higher bandwidth, but if the total bandwidth demanded by all customers exceeds the trunk capacity, the excess cells would simply be dropped, without buffering or notification to the customer's equipment that data was being lost. The TCP layer of the internet site to which the customer is connected would normally request retransmission in this scenario. It should be noted that ATM are not suited to bursting beyond the CIR—a limitation of ATM. However, this approach avoids these problems by fixing upstream bandwidth available over at the ADSL connections (the ADSL's "sync rate"). Without bandwidth sharing, the system in accordance with one embodiment of the present invention can be configured to handle more upstream data by limiting the number of RTU connections, or increasing the number of trunks. For example, with only two customers connected and one GDSL trunk (or 4 customers and 2 trunks), the maximum upstream rate would be approximately 750 kbps. It should be noted that this is also a committed rate and it is always available.

On the other hand, with bandwidth sharing, if end-users are to be allowed to burst (send data temporarily at a rate higher than the guaranteed rate) to a higher upstream bandwidth, and the ADSL link section 230 in RTU 108 cannot handle flow control over the ADSL link, then the system architecture may be modified accordingly. For example, RTU 108 may be configured to open ATM cells, reassemble IP packets, terminate the IP packets, understand TCP, and respond using TCP for flow control, add ATM header back to upstream cells and calculate, or retrieve from storage, the HEC. Naturally, this approach increases the complexity of the system as well as the related costs.

In another approach, FPGA 221 of RTU 108 may be configured to select an ADSL channel and poll it for an available cell. If there isn't one available, it polls the next channel, and the next, and so on. When it receives an indication that there is a cell ready, it pulls it from the ADSL link section 230, buffers it, and sends it during 5 frames. On the other hand, if it doesn't receive a cell, it sends the idle cell, which it can generate itself.

If end-users are to be allowed to burst to a higher downstream bandwidth, RTU 108 configures ADSL link section 230 to send as much downstream data as possible over the ADSL link. Moreover, RTU 108 may be configured to send its ports' ADSL connect rates to CTU 100. CTU 100 then slows its connection to DSLAM 106 as needed to keep it at or below the rate at which RTU 108 sends data downstream to CPE 109 on the corresponding port. When downstream bursting is implemented, RTU 108 may be configured to use ADSL link section 230 at RTU 108 to insert idle ATM cells to fill the downstream channels.

Referring back to FIGS. 1 and 3, similarly, in the upstream direction, CTU 100 configures its ADSL link section 310 to send as much data as possible to DSLAM 106. This amount is lower than the downstream rate, as it is in the reverse channel. CTU 100 can communicate the result of the setup to RTU 108, which ensures that the maximum allowed upstream rate from CPE 109 to RTU 108 does not exceed the rate from CTU 100 to DSLAM 106.

Thus, with bandwidth sharing, ADSL data transmission from multiple users (for example, four in this case) may be transmitted over a single twisted transmission path 111 to RTU 108 using the addressing schemes and FIFOs for effectively multiplexing the ATM data. Compared to systems which dedicate a single line-powered copper pair to each customer (and thus effectively requiring a dedicated remote termination unit and repeaters to each customer), the use of a single twisted pair for multiple user access provides significant savings in the usage of the twisted pairs in the copper network.

Figure 4:
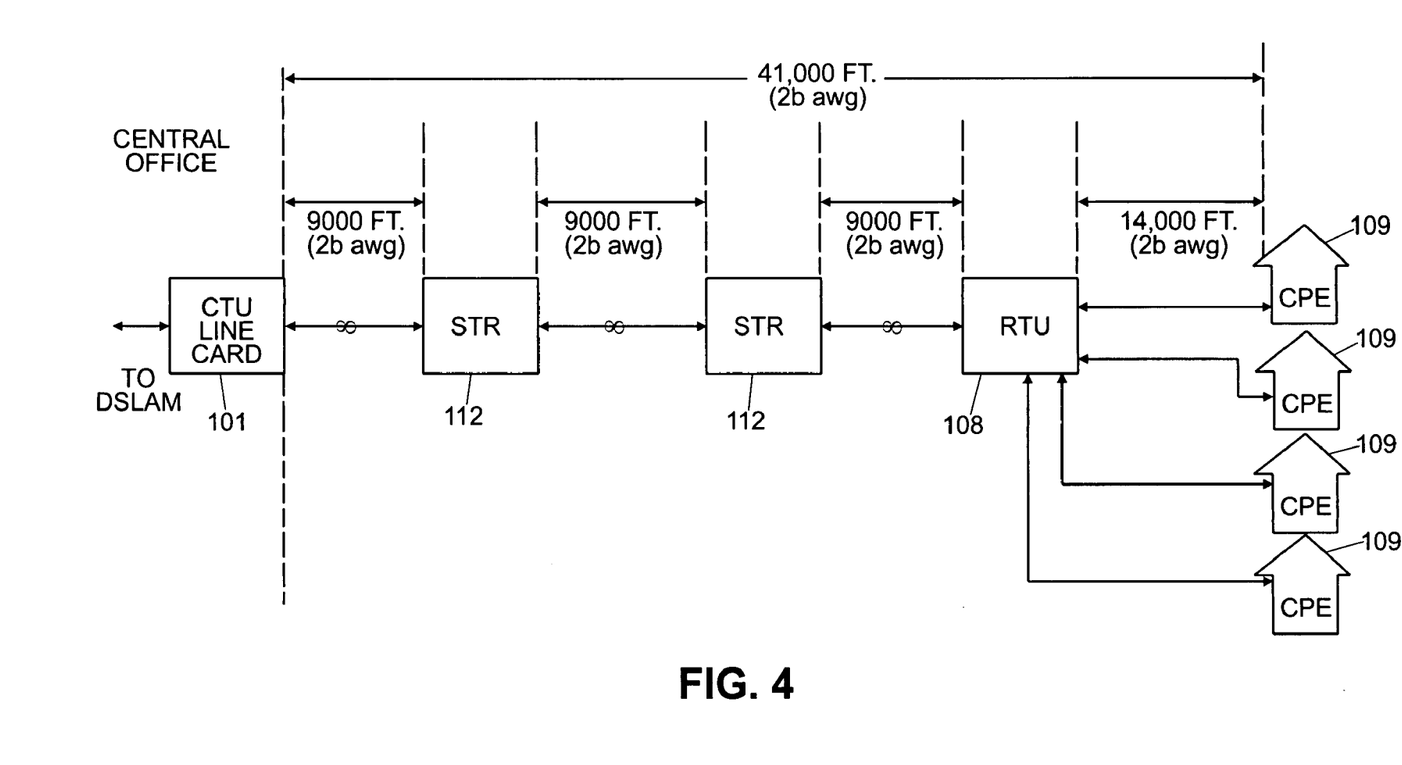
FIG. 4 illustrates one embodiment of the present invention shows the geographic locations and distances between its elements, including total system reach.

FIG. 4 illustrates one embodiment of the present invention showing the geographic locations and distances between its elements, including total system reach. Referring to FIG. 4, it can be seen that using 26 awg twisted pair wire and two symmetric straight-through repeaters (STRs) 112 in the transmission path 111, a total of 41,000 feet can be achieved from the central office to the customer's Customer Premise Equipment. Alternatively, using 24 awg twisted pair wire instead of 26 awg wire in the transmission path 111, the overall ADSL system reach may be further extended an additional 30% to 55,000 feet, 75,000 feet on 22 gauge wire, and finally, as far as 111,000 feet on 19 gauge wire.

Furthermore, RTU 108, and STRs 112 deployed between CTU line card 101 and RTU 108 may be powered from the copper pair on which they transmit their GDSL signals. Indeed, CTU line card 101, residing in the telephone company's central office, may be provided with a line-powering circuit which supplies ample voltage and current to the copper pair to power the remote units. Additionally, in one embodiment, the system may have outside plant elements, either STRs 112 or RTUs 108, which use local power sources instead of taking their power from the copper twisted pair 111. In this case, the distance reach of the overall system may be further extended beyond that described above.

Figure 5:
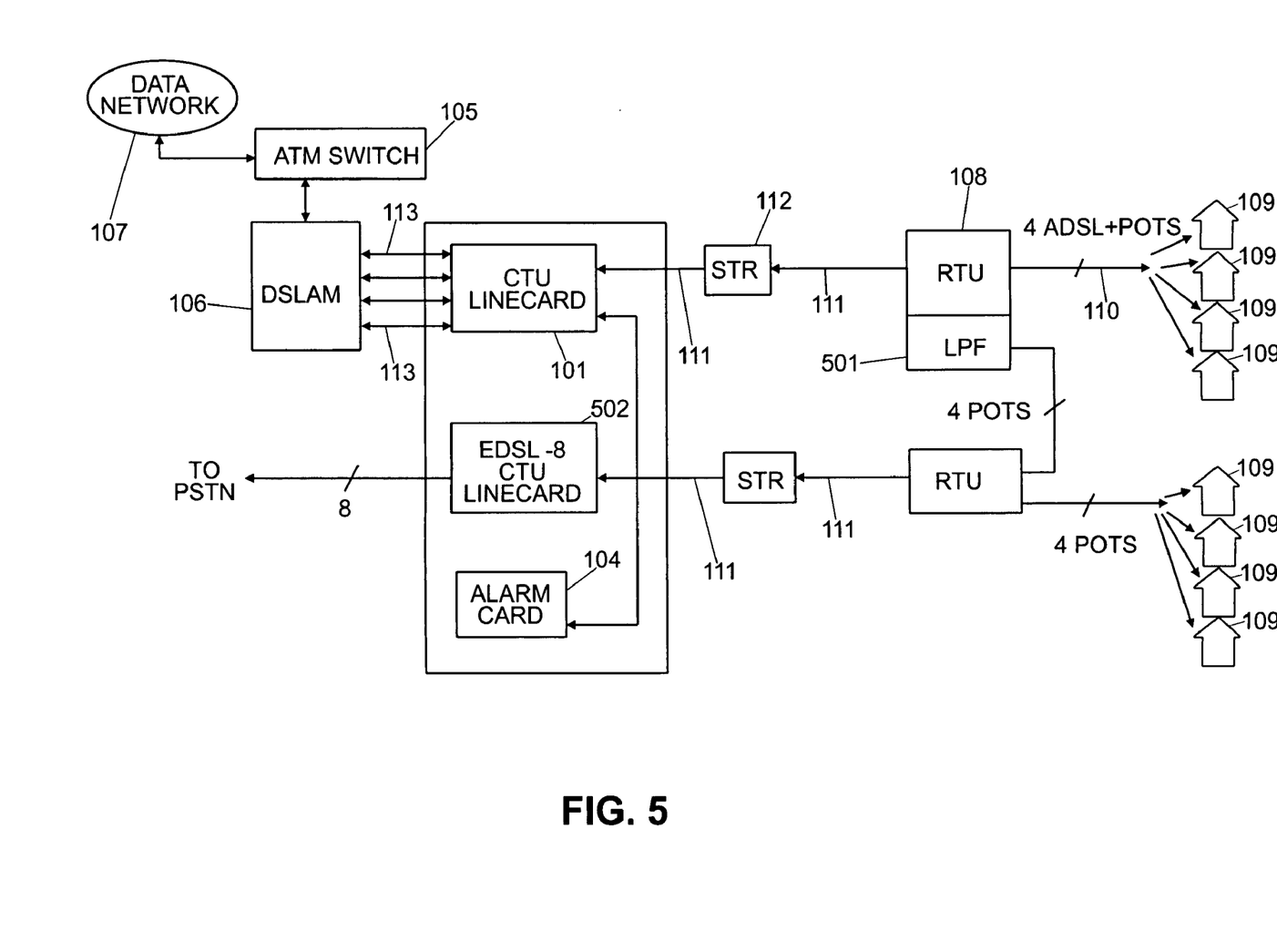
FIG. 5 illustrates one embodiment of the present invention implemented in GDSL-8 telephony pairgain system producing a mixed data plus voice line-powered system.

FIG. 5 illustrates one embodiment of the present invention which incorporates ADSL data service and ordinary POTS service to be provided to the user's residence on the same ADSL pair 110. Referring to FIG. 5, there is shown RTU 108 configured to operate with GDSL-8 line card 502 of the GDSL-8 system available from GoDigital Networks Corporation. The GDSL-8 system is a line-powered, repeatered system that carries 8 POTS circuits on a single twisted pair. In the embodiment illustrated in FIG. 5, the system is configured to provide 8 POTS services and 4 ADSL services on two pairs 111. These POTS and ADSL services can be combined in the passive ADSL filter circuitry provided by low pass filter (LPF) 501, which, in one embodiment, may be incorporated into the design of RTU 108, to generate, for example, 4 ADSL plus POTS pairs and another 4 POTS-only pairs. The design is modular in nature and more services may be added in increments of 4 ADSL services, or 8 POTS services, to achieve the desired number of services needed at a particular given location.

Referring to FIG. 5, in this embodiment, LPF 501 may be standard low pass filter circuitry commercially available from third-party vendors. With ordinary ADSL deployments on short loops, this configuration is deployed at the telephone company's central office, thus combining the POTS and ADSL signals onto the same wire pair before the pair leaves the central office. In this embodiment, the combining of the ADSL and POTS is instead accomplished remotely, at RTU 108. In this manner, simultaneous transmission of data and baseband POTS on the same pair, a significant advantage of ADSL service, is preserved. By contrast, presently available xDSL services which use repeaters do not have this feature, since they do not allow for the combining of POTS and ADSL at their outside plant elements.

It is important to note that the source of the POTS circuits which are combined with ADSL at the RTU 108 does not have to be a system provided by GoDigital Networks Corporation. The POTS circuits may be a pairgain device supplied by other manufacturers, a DLC (digital loop carrier) supplied by another manufacturer, or they could simply be POTS lines on individual pairs from the central office to the location of RTUs 108. Any of these scenarios will function properly for creating an ADSL plus POTS service on the pair 110 which runs to the customer's premises. It is also important to note that the inclusion of POTS is not necessary for the ADSL circuit to function; it will work equally well in the absence of a POTS circuit on the same pair 110.

Accordingly, the cost of common equipment can be shared among ADSL users. An additional benefit is that each user will appear to have the full bandwidth of the GDSL links (approximately 1.5 Mbit/second symmetric in one embodiment for each link) when downloading in most cases, although the guaranteed information rate would be less (a proportional share of the total GDSL bandwidth). Indeed, in accordance with the present invention, the benefits of networking and shared facilities beyond their normal domain can be realized, effectively providing pair gain for ADSL data instead of for voice telephony.

As can be seen from the above, in accordance with the present invention, method and apparatus for transporting ADSL service to long distances using a symmetric intermediate DSL transport is disclosed. More specifically, the present invention provides a system and method for extending the reach of ADSL (or other) internet access from its present 15 to 18 Kft to over 40,000 feet (approximately 99% of all subscribers) using line-powered repeaters and remote terminal units. In addition, the long loop broadband system in accordance with the present invention allows data from different ADSL users to be shared on a single copper distribution pair. The multiple ADSL users may share the bandwidth on the symmetric GDSL links connected between RTU 108 and CTU line card 101 by taking ATM cells from the ADSL connection, which are properly addressed and sent over the symmetric DSL links. Moreover, it should be noted that the ADSL services described above may be deployed in symmetric or asymmetric speeds.

Indeed, in accordance with the present invention, using symmetric repeaters (in one embodiment, using G.shdsl PAM-16 coding) transmission of ADSL service over longer distances can be achieved. While it may be possible to use asymmetric repeaters (i.e., ADSL-based repeaters) to extend the ADSL range, ADSL-based repeaters (referred to as intermediate transmission units) could not be used to significantly extend the reach of ADSL service without being spectrally incompatible with ordinary, non-repeatered ADSL system. In particular, one advantage of ADSL systems is that, since ADSL systems transmit in different bands upstream and downstream, they are generally not subject to near-end crosstalk from other ADSL systems operating at the same end-point locations. However, in the presence of far-end crosstalk from other ADSL transmitters, the system performance degradation is noticeably significant. Further information on the impact of ADSL's performance in the presence of far end crosstalk from other ADSL transmitters can be found in a contribution to T1 committee T1 E1.4, contribution T1 E1.4/2000-336, available at www.t1.org.

In view of the foregoing, using symmetric DSL transmission (such as G.shdsl, for example) in accordance with one embodiment of the present invention, the range of ADSL service can be significantly extended which preserving compatibility with non-repeatered ADSL transmission. Furthermore, since in symmetric transmission the upstream and downstream link distances between the transmission units (i.e., the distance between the repeaters STRs 112 themselves, or the distance between a repeater STR 112 and CTU line card 101 or RTU 108), are substantially the same, it is easier to determine repeater spacings and thus deployment of the repeaters such that robust transmission performance is maintained. Additionally, since most symmetric DSL transmission schemes use less power than ADSL transmitters, they may be better suited for line-powered systems such as in the case of the long loop broadband system in accordance with the present invention.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A data loop extension for a communication system, comprising:
    a symmetric bi-directional transmission line having a first end and a second end;
    a remote termination unit coupled between the first end of the transmission line and a plurality of customer premise equipment, the remote termination unit configured to receive a plurality of ATM data from each customer premise equipment over a respective ADSL link for transmission over the transmission line;
    a line card coupled to the second end of the transmission line configured to receive the ATM data transmitted from the remote termination unit over the transmission line; and
    at least one repeater coupled between the first and second end of the transmission line configured to detect the ATM data received from the remote termination unit and to regenerate the ATM data for transmission to the line card wherein the transmission line supports G.shdsl PAM-16 coding and supports a transmission rate of approximately 1.544 Mbps.

2. A data loop extension for a communication system, comprising:
    a symmetric bi-directional transmission line having a first end and a second end;
    a remote termination unit coupled between the first end of the transmission line and a plurality of customer premise equipment, the remote termination unit configured to receive a plurality of ATM data from each customer premise equipment over a respective ADSL link for transmission over the transmission line;
    a line card coupled to the second end of the transmission line configured to receive the ATM data transmitted from the remote termination unit over the transmission line; and
    at least one repeater coupled between the first and second end of the transmission line configured to detect the ATM data received from the remote termination unit and to regenerate the ATM data for transmission to the line card wherein the transmission line is a 26 gauge bi-directional single twisted copper pair, and further, wherein the distance between each ADSL link between the line card and the customer premise equipment is approximately 41,000 feet.

3. A data loop extension for a communication system, comprising:
    a symmetric bi-directional transmission line having a first end and a second end;
    a remote termination unit coupled between the first end of the transmission line and a plurality of customer premise equipment, the remote termination unit configured to receive a plurality of ATM data from each customer premise equipment over a respective ADSL link for transmission over the transmission line;
    a line card coupled to the second end of the transmission line configured to receive the ATM data transmitted from the remote termination unit over the transmission line;
    at least one repeater coupled between the first and second end of the transmission line configured to detect the ATM data received from the remote termination unit and to regenerate the ATM data for transmission to the line card; and
    a power supply unit coupled to the line card configured to provide approximately 30 watts to the transmission line.

4. A data loop extension for a communication system, comprising:
    a symmetric bi-directional transmission line having a first end and a second end;
    a remote termination unit coupled between the first end of the transmission line and a plurality of customer premise equipment, the remote termination unit configured to receive a plurality of ATM data from each customer premise equipment over a respective ADSL link for transmission over the transmission line;
    a line card coupled to the second end of the transmission line configured to receive the ATM data transmitted from the remote termination unit over the transmission line;
    at least one repeater coupled between the first and second end of the transmission line configured to detect the ATM data received from the remote termination unit and to regenerate the ATM data for transmission to the line card; and
    an alarm card unit coupled to the line card for providing alarm information.

5. The system of claim 4 wherein the alarm information includes information related to data channels out of service.

6. A data loop extension for a communication system, comprising:
    a symmetric bi-directional transmission line having a first end and a second end;
    a remote termination unit coupled between the first end of the transmission line and a plurality of customer premise equipment, the remote termination unit configured to receive a plurality of ATM data from each customer premise equipment over a respective ADSL link for transmission over the transmission line;
    a line card coupled to the second end of the transmission line configured to receive the ATM data transmitted from the remote termination unit over the transmission line;
    at least one repeater coupled between the first and second end of the transmission line configured to detect the ATM data received from the remote termination unit and to regenerate the ATM data for transmission to the line card; and
    a second repeater coupled between either of the first and second ends of the transmission line and the at least one repeater, wherein the distance between the second repeater and the at least one repeater is approximately 9,000 feet.

7. A data loop extension for a communication system, comprising:

a symmetric bi-directional transmission line having a first end and a second end;

a remote termination unit coupled between the first end of the transmission line and a plurality of customer premise equipment, the remote termination unit configured to receive a plurality of ATM data from each customer premise equipment over a respective ADSL link for transmission over the transmission line;

a line card coupled to the second end of the transmission line configured to receive the ATM data transmitted from the remote termination unit over the transmission line;

at least one repeater coupled between the first and second end of the transmission line configured to detect the ATM data received from the remote termination unit and to regenerate the ATM data for transmission to the line card; and wherein each of said ADSL links coupled to a respective one of said plurality of customer premise equipments may be configured to support a substantially minimum data rate of approximately 384 kbps and further wherein each of said ADSL links may be configured to instantaneously burst to a data rate of up to approximately 1.544 Mbps.

8. A data loop extension for a communication system, comprising:

a symmetric bi-directional transmission line having a first end and a second end;

a remote termination unit coupled between the first end of the transmission line and a plurality of customer premise equipment, the remote termination unit configured to receive a plurality of ATM data from each customer premise equipment over a respective ADSL link for transmission over the transmission line;

a line card coupled to the second end of the transmission line configured to receive the ATM data transmitted from the remote termination unit over the transmission line; and at least one repeater coupled between the first and second end of the transmission line configured to detect the ATM data received from the remote termination unit and to regenerate the ATM data for transmission to the line card wherein said at least one repeater comprises an add/drop repeater.

9. A data loop extension for a communication system, comprising:

a symmetric bi-directional transmission line having a first end and a second end;

a remote termination unit coupled between the first end of the transmission line and a plurality of customer premise equipment, the remote termination unit configured to receive a plurality of ATM data from each customer premise equipment over a respective ADSL link for transmission over the transmission line;

a line card coupled to the second end of the transmission line configured to receive the ATM data transmitted from the remote termination unit over the transmission line;

at least one repeater coupled between the first and second end of the transmission line configured to detect the ATM data received from the remote termination unit and to regenerate the ATM data for transmission to the line card;

a data bus coupled to said line card configured receive bit streams of decoded ATM data from said line card;

an ATM switch coupled to a data network; and an ATM controller coupled to said data bus configured to receive said data bit streams from said data bus, said ATM controller further configured to connect said ATM switch via an ATM link for communication with said network wherein ATM controller is further configured to generate clock and transmission information.

10. A data loop extension for a communication system, comprising:

a symmetric bi-directional transmission line having a first end and a second end;

a remote termination unit coupled between the first end of the transmission line and a plurality of customer premise equipment, the remote termination unit configured to receive a plurality of ATM data from each customer premise equipment over a respective ADSL link for transmission over the transmission line;

a line card coupled to the second end of the transmission line configured to receive the ATM data transmitted from the remote termination unit over the transmission line;

at least one repeater coupled between the first and second end of the transmission line configured to detect the ATM data received from the remote termination unit and to regenerate the ATM data for transmission to the line card;

a data bus coupled to said line card configured receive bit streams of decoded ATM data from said line card;

an ATM switch coupled to a data network; and an ATM controller coupled to said data bus configured to receive said data bit streams from said data bus, said ATM controller further configured to connect said ATM switch via an ATM link for communication with said network wherein said ATM switch is configured to perform bandwidth management.

11. A data loop extension for a communication system, comprising:

a symmetric bi-directional transmission line having a first end and a second end;

a remote termination unit coupled between the first end of the transmission line and a plurality of customer premise equipment, the remote termination unit configured to receive a plurality of ATM data from each customer premise equipment over a respective ADSL link for transmission over the transmission line;

a line card coupled to the second end of the transmission line configured to receive the ATM data transmitted from the remote termination unit over the transmission line;

at least one repeater coupled between the first and second end of the transmission line configured to detect the ATM data received from the remote termination unit and to regenerate the ATM data for transmission to the line card;

a data bus coupled to said line card configured receive bit streams of decoded ATM data from said line card;

an ATM switch coupled to a data network; and an ATM controller coupled to said data bus configured to receive said data bit streams from said data bus, said ATM controller further configured to connect said ATM switch via an ATM link for communication with said network wherein said data bus includes a TDM backplane bus.

12. The system of claim 11 wherein said TDM backplane maybe 8 bits wide.

13. A data loop extension for a communication system, comprising:

a symmetric bi-directional transmission line having a first end and a second end;

a remote termination unit coupled between the first end of the transmission line and a plurality of customer premise equipment, the remote termination unit configured to receive a plurality of ATM data from each customer premise equipment over a respective ADSL link for transmission over the transmission line;

a line card coupled to the second end of the transmission line configured to receive the ATM data transmitted from the remote termination unit over the transmission line wherein said line card includes a plurality of two-wire connections;

at least one repeater coupled between the first and second end of the transmission line configured to detect the ATM data received from the remote termination unit and to regenerate the ATM data for transmission to the line card;

a DSLAM including a plurality of ADSL ports, each of said plurality of ADSL ports coupled to a corresponding two-wire connection of said line card, said line card further configured to convert said received ATM data into ADSL data format for transport over said respective two-wire connections to the corresponding ADSL port of said DSLAM; and an ATM switch coupled to a data network, said ATM switch further coupled to said DSLAM for connection to said data network.

14. The system of claim 13 wherein said line card and said DSLAM reside in the same central office.

15. The system of claim 13 wherein said line card includes four, two-wire connections, and further, DSLAM includes four corresponding ADSL ports.

* * * * *